United States Patent [19]

Garoff et al.

[11] Patent Number: 5,710,229
[45] Date of Patent: *Jan. 20, 1998

[54] LARGE-POLE POLYOLEFIN, A METHOD FOR ITS PRODUCTION AND A PROCATALYST CONTAINING A TRANSESTERIFICATION PRODUCT OF A LOWER ALCOHOL AND A PHTHALIC ACID ESTER

[75] Inventors: Thomas Garoff, Helsinki; Timo Leinonen, Tolkkinen; Eero Iiskola, Porvoo, all of Finland

[73] Assignee: Borealis Holding A/S, Lyngby, Denmark

[*] Notice: The term of this patent shall not extend beyond the expiration date of Pat. No. 5,234,879.

[21] Appl. No.: 431,796

[22] Filed: May 1, 1995

Related U.S. Application Data

[63] Continuation of Ser. No. 146,065, filed as PCT/FI92/00083, Mar. 23, 1992, published as WO92/19659, Nov. 12, 1992, abandoned.

[30] Foreign Application Priority Data

May 9, 1991 [FI] Finland ................................. 912264

[51] Int. Cl.$^6$ ........................... C08F 210/00; C08F 4/654
[52] U.S. Cl. ..................... 526/348; 526/351; 526/125.3; 526/125.6; 526/124.6; 502/107; 502/127
[58] Field of Search ............................. 526/125.3, 125.6, 526/348, 351, 124.6; 502/107, 127

[56] References Cited

U.S. PATENT DOCUMENTS

| | | | |
|---|---|---|---|
| 4,442,276 | 4/1984 | Kashiwa et al. | 526/125 |
| 4,473,660 | 9/1984 | Albizzati et al. | 502/124 |
| 4,761,461 | 8/1988 | Jaggard et al. | 526/125 |
| 4,829,034 | 5/1989 | Iiskolan et al. | 302/9 |
| 5,234,879 | 8/1993 | Garoff et al. | 502/107 |
| 5,360,776 | 11/1994 | Iiskola et al. | 502/111 |

FOREIGN PATENT DOCUMENTS

| | | |
|---|---|---|
| 0226003 | 6/1987 | European Pat. Off. |
| 0488537 | 6/1992 | European Pat. Off. |
| 8707620 | 12/1987 | WIPO |

*Primary Examiner*—Mark Nagumo
*Attorney, Agent, or Firm*—Birch, Stewart, Kolasch & Birch, LLP

[57] ABSTRACT

The invention relates to a method for preparing polyolefins by polymerizing an olefin with a procatalyst composition prepared by bringing together $MgCl_2$, a lower alcohol, a titanium compound and a phthalic acid ester. The invention also relates to a polyolefin obtained by polymerizing an olefin in the presence of a procatalyst prepared by bringing together $MgCl_2$, a lower alcohol, a titanium compound and a phthalic acid ester, as well as to a procatalyst composition suitable for the preparation of a large-pore polyolefin, which composition has been prepared by bringing together $MgCl_2$, a lower alcohol, a titanium compound and a phthalic acid ester.

28 Claims, 12 Drawing Sheets

LARGE-PORE POLYOLEFIN, A METHOD FOR ITS PRODUCTION AND A PROCATALYST CONTAINING A TRANSESTERIFICATION PRODUCT OF A LOWER ALCOHOL AND A PHTHALIC ACID ESTER

This application is a continuation of application Ser. No. 08/146,065 filed on Nov. 9, 1993, now abandoned.

BACKGROUND OF THE INVENTION

1. Field of the Invention

The invention relates to a method for preparing polyolefins by polymerizing olefin with a procatalyst composition prepared by bringing together $MgCl_2$, a lower alcohol, a titanium compound, and a phthalic acid ester. The invention also relates to a polyolefin obtained by polymerizing olefin in the presence of a procatalyst prepared by bringing together $MgCl_2$, a lower alcohol, a titanium compound and a phthalic acid ester, as well as to a procatalyst composition suitable for the preparation of a large-pore polyolefin, which composition has been prepared by bringing together $MgCl_2$, a lower alcohol, a titanium compound, and a phthalic acid ester.

2. Description of the Prior Art

Olefins, in particular α-olefins, are often polymerized using a catalyst composition in which the procatalyst is made up of a compound of a transition metal of groups IV–VI of the periodic table and a compound of a metal of groups I–III of the periodic table which activates it by reduction, i.e. a cocatalyst. The so-called Ziegler-Natta procatalyst has been developed further by using as the support for the transition-metal compound an inert carrier onto which the transition-metal compound is deposited, the purpose being thus to improve the activity of the procatalyst in catalyzing the polymerization reaction.

However, under the action of this procatalyst composition, asymmetric olefin monomers often polymerize into different stereoisomeric polymers and, for example, mixtures of an isotactic, an atactic, and a syndiotactic polymer are obtained, from which the desired stereoisomer must be separated by a wash and other such steps, which are often cumbersome. When it has been desired to prepare a polymer which is in the main of a certain stereospecific form, for example an isotactic polyolefin, from an asymmetric olefin monomer, the effect of the catalyst on the stereospecificity of the product obtained has been improved by adding a donor compound to the catalyst.

Owing to its steric structure of a certain type, the donor compound contributes to the settling of the monomer molecule in a certain position in the catalyst particle at the end of the growing polymer molecule, and thus the molecule chain of the polymer obtains a certain stereoisomeric structure and the polymer product obtained is more or less of the desired type, depending on the donor compound selected.

There are two possible ways of adding a donor to the catalyst: a so-called internal donor is added already to the procatalyst mixture of the transition-metal compound and the carrier, or the donor is added to the mixture of the monomer and the catalyst component as late as in the polymer reactor at the time that the cocatalyst is added, in which case the donor is called an external donor. Of course, it is also possible to use a donor compound in both steps, in which case the donor may be the same or a different compound in the different steps.

All monomers are asymmetric, i.e. stereospecifically polymerizable monomers, except ethylene, in which all side groups of the unsaturated carbon atom are hydrogens, and the rare case in which all side groups are the same, for example, tetramethylethylene. A certain stereospecific form is made desirable by the fact that the properties of the obtained polymer are most advantageous for a certain purpose; for example, isotactic polyolefins crystallize better, their bulk density is higher, their mechanical properties are better, i.e. they are, for example, stronger, etc. The adhesion properties of the atactic form are usually better than those of other tactic forms, and they are therefore suitable for adhesive applications.

In the polymerization of asymmetric olefin monomers, i.e. when the groups linked to carbon atoms linked by an unsaturated bond are different at least with respect to one group, the catalyst may contain a compound which improves the stereospecificity of the catalyst, i.e. it may contain an electron donor which, readily yielding an electron, may link to the rest of the catalyst structure and, owing to its steric action, direct the monomer molecule being linked to the polymer chain into such a position that the forming polymer molecule will have a structure which is stereospecific in a certain way. Such donors include a large number of different organic compounds, e.g. esters, carboxylic acids, alcohols, ketones, aldehydes, nitriles, amides, amines, organic compounds of phosphorus and silicon, etc. These compounds also have other effects on the properties of the catalyst; for example, the activity of the catalyst varies depending on the donor used. If the donor used is a carboxylic acid ester, common choices are aromatic carboxylic acid esters, e.g. benzoates, phthalates, toluates, anisates, etc. The most advantageous donors among these are dialkyl phthalates.

Owing to the so-called replica phenomenon, the physical structure of the procatalyst carrier is repeated in the entire procatalyst composition, and ultimately also in the polymer product, and therefore the morphology of the procatalyst composition is very important in terms of polymerization.

In the art there are also known combinations of different donors. Thus, for example, a procatalyst composition which is prepared of $MgCl_2$, 2-ethylhexyl alcohol, titanium tetrachloride, di-isobutyl phthalate, and in some cases a phthalic acid anhydride, is known from JP publications 59172507, 59206409, 59206415, 59206416, 59206424, 60262804, 61103910, and 61108614.

The patent family which includes publications DE-3 540 699, EP-226 003, and U.S. Pat. No. 4,761,461 discloses a method for the preparation of propylene polymers by means of a procatalyst composition obtained by bringing together, under predetermined conditions, $MgCl_2$, an alkanol such as ethanol, a phthalic acid ester such as di-isobutyl phthalate, and titanium tetrachloride. The phthalic acid ester can be added either in the step in which $MgCl_2$ and ROH react with each other or in the step in which the reaction product of $MgCl_2$ and alkanol are caused to react with titanium tetrachloride.

By the use of the above-mentioned procatalyst compositions and polymerization methods, small-pore polyolefins are obtained with which additives, such as antioxidants, do not mix readily or permanently.

SUMMARY OF THE INVENTION

It is an object of the invention to provide an active and stereospecific procatalyst composition. It is also an object of the invention to lower the titanium and donor contents of the catalyst, and thereby of the polyolefin, since these impurities respectively cause, for example, color problems and detrimental aromatic properties in the polyolefin. The aim in the present invention is in particular a method and catalyst by means of which the pore size of polyolefin can be increased, and a corresponding large-pore polyolefin.

The objects set for the invention have now been attained by a new method for the preparation of polyolefins, which method is polymerizing olefin by means of a procatalyst composition prepared by bringing together $MgCl_2$, a lower alcohol, a titanium compound, and a phthalic acid ester, where a transesterification reaction is carried out between the lower alcohol and the phthalic acid ester in the preparation of the procatalyst composition, and the phthalic acid ester has at least ten carbon atoms in its alkoxy moiety. The invention also relates to a new polyolefin, which is obtained by polymerizing olefin in the presence of a procatalyst prepared by bringing together $MgCl_2$, a lower alcohol, a titanium compound and a phthalic acid ester, where a transesterification reaction is carried out between the lower alcohol and the phthalic acid ester, and the phthalic acid ester has at least ten carbon atoms in its alkoxy moiety, and to a new procatalyst composition suitable for the preparation of large-pore polyolefin, which composition is prepared by bringing together $MgCl_2$, a lower alcohol, a titanium compound and a phthalic acid ester, where a transesterification reaction is carried out between the lower alcohol and the phthalic acid ester, and the phthalic acid ester has at least ten carbon atoms in its alkoxy moiety.

DETAILED DESCRIPTION OF THE INVENTION

The present invention will become more fully understood from the detailed description given hereinbelow and the accompanying drawings which are given by way of illustration only, and thus are not limitative of the present invention, and wherein.

| Rate: | 10.0° C./min |
|---|---|
| Integration | |
| Delta H | 334 mJ |
| | 107.5 J/g |
| Peak | 161.6° C. |
| | −1.2 W/g |
| Content | 51.4% |
| Ref dH | 209.0 J/g; |

Figure 20:
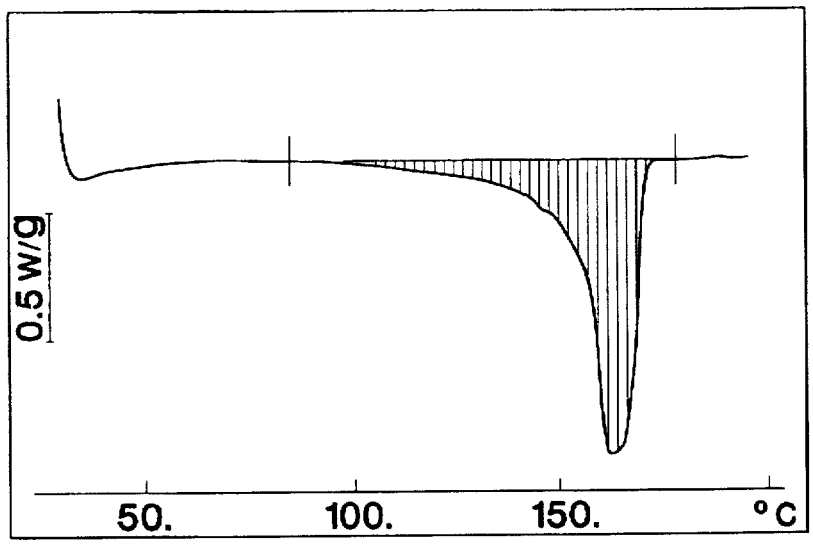

FIG. 20 is a DSC curve of the polymer PP-C-8,

| Rate: | 10.0° C./min |
|---|---|
| Integration | |
| Delta H | 352 mJ |
| | 108.3 J/g |
| Peak | 161.6° C. |
| | −1.2 W/g |
| Content | 51.8% |
| Ref dH | 209.0 J/g; |

Figure 21:
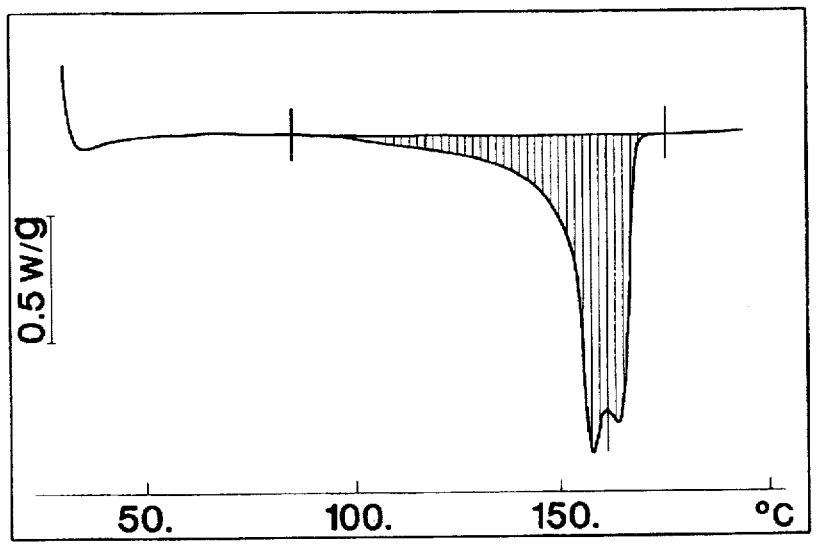

FIG. 21 is a DSC curve of the polymer PP-C-13,

| Rate: | 10.0° C./min |
|---|---|
| Integration | |
| Delta H | 247 mJ |
| | 76.7 J/g |
| Peak | 158.3° C. |
| | −1.1 W/g |
| Integration | |
| Delta H | 102 mJ |
| | 31.7 J/g |
| Peak | 164.3° C. |
| | −1.0 W/g; |

Figure 22:
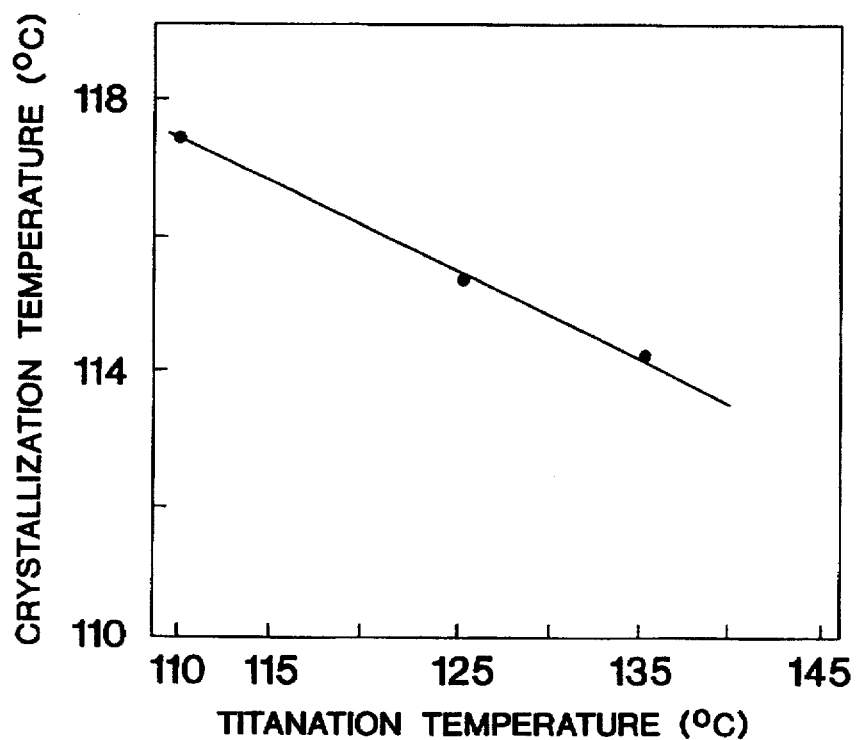
Figure 23:
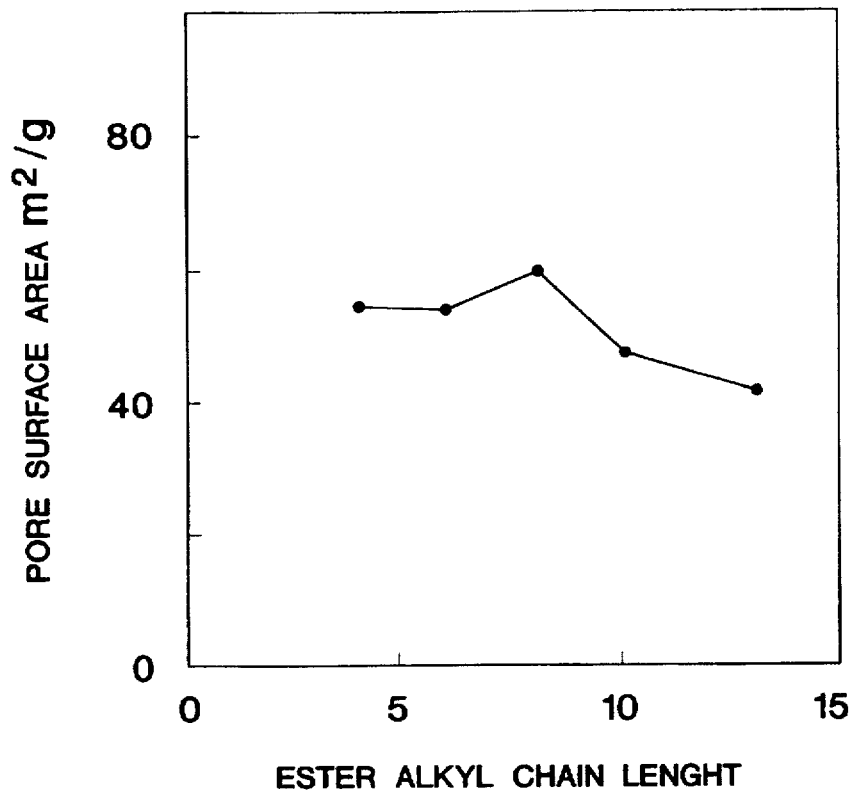
Figure 24:
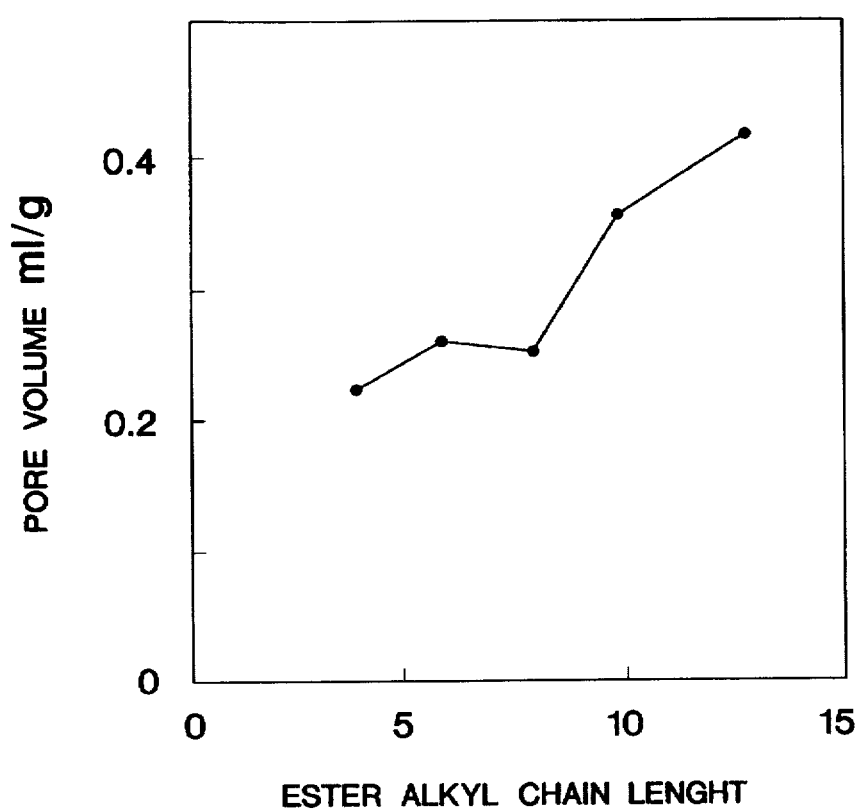
Figure 25:
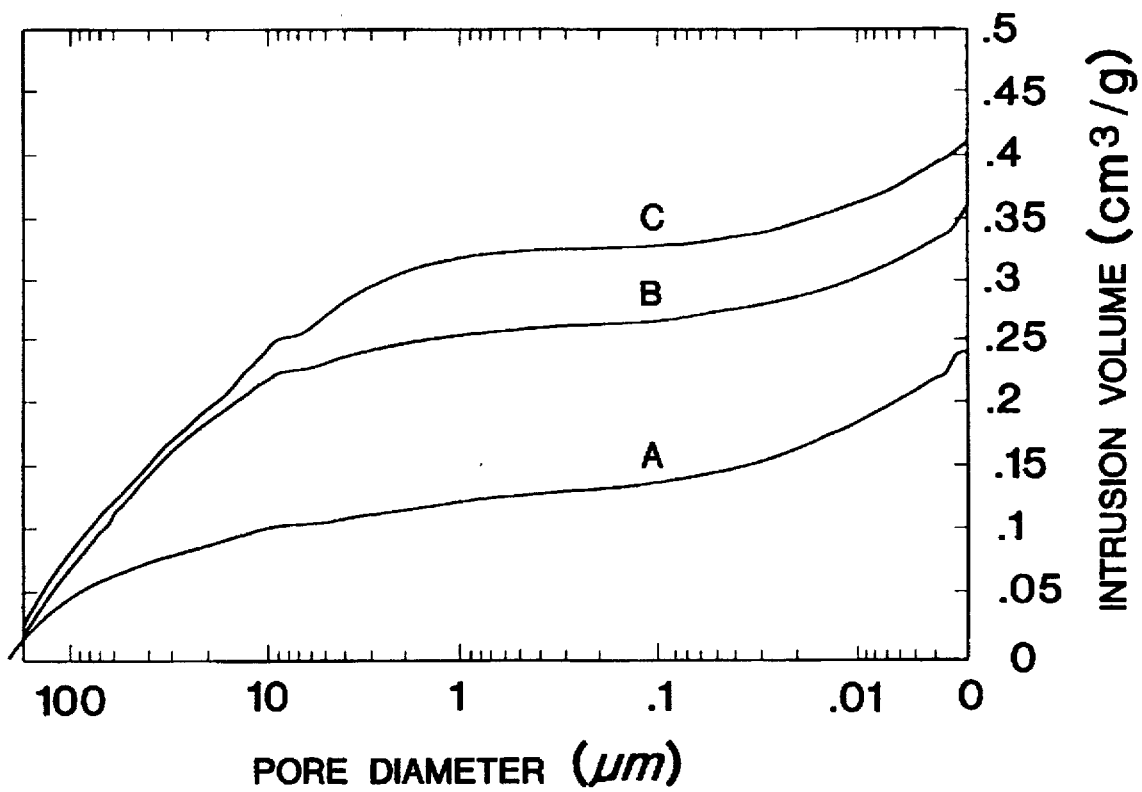
Figure 26:
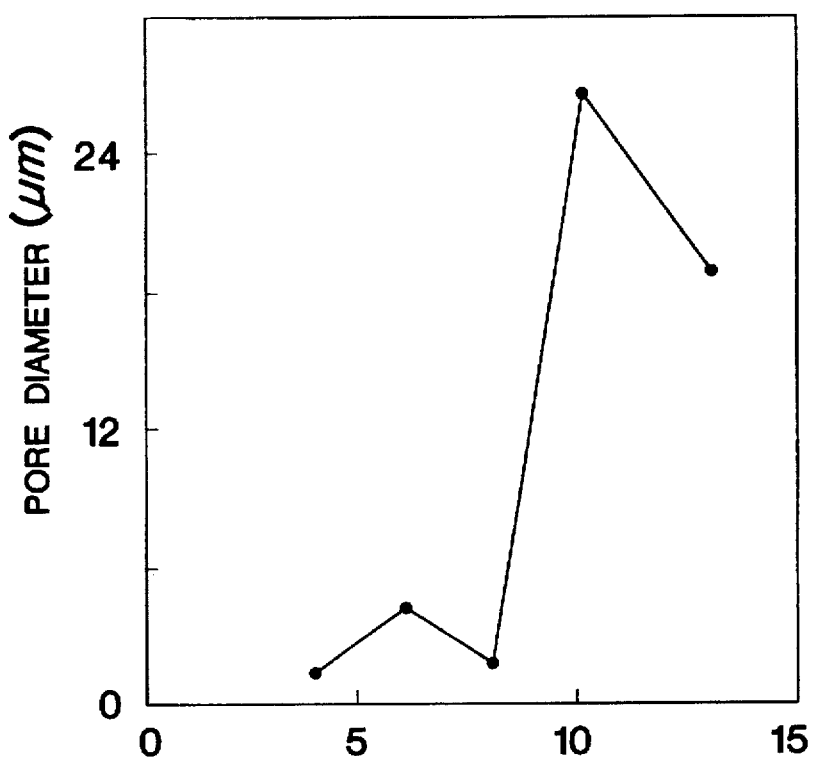
Figure 27:
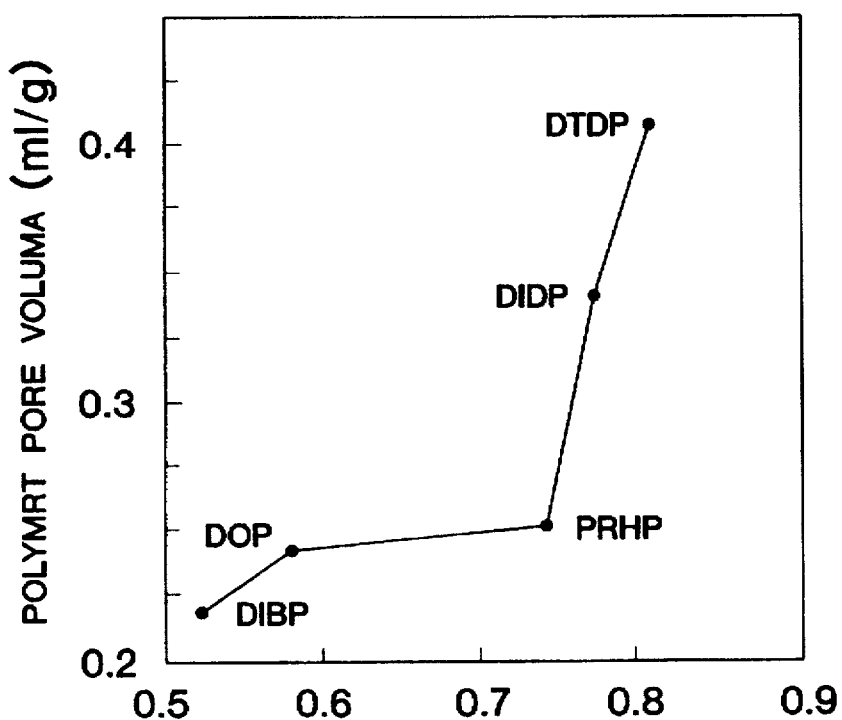

FIG. 22 is a graph showing the crystallization temperature of polypropylene as a function of the titanation ($TiCl_4$ treatment) temperature used in the catalyst synthesis;

FIG. 23 is a graph showing the pore surface area ($m^2/g$) in the polymers as a function of the alkyl group chain length in the donor;

FIG. 24 is a graph showing the pore volume (ml/g) in the polymers as a function of the chain length of the alkyl group in the donor;

FIG. 25 is a graph showing the pore volume distributions of polymers PP-C-8 (A), PP-C-10 (B) and PP-C-13 (C);

FIG. 26 is a graph showing the median pore diameter of the polymers as a function of the alkyl chain length; and FIG. 27 is a graph showing the correlation between the pore volumes in the catalysts and in the polymer.

It has thus been discovered that, when a procatalyst composition prepared by bringing together MgCl$_2$, a lower alcohol, a titanium compound and a phthalic acid ester is used, the pore size of the polyolefin product can be increased by carrying out, in connection with the preparation of the procatalyst, a transesterification between the lower alcohol and the phthalic acid ester and by selecting a phthalic acid ester the alkoxy group of which has at minimum ten carbon atoms.

The MgCl$_2$ carrier of the procatalyst composition used in the polymerization method according to the invention can be used as such or by combining it with silica, for example by impregnating silica with a solution or slurry which contains MgCl$_2$. It is also important that the MgCl$_2$ used is pure and anhydrous.

The lower alcohol used may be any C$_1$–C$_4$ alcohol. Methanol and ethanol, in particular ethanol, are preferred alcohols.

Since under the effect of the so-called replica phenomenon the physical structure of the catalyst carrier is repeated in the entire catalyst composition, and this subsequently in the polymer product obtained, it is very important to render the physical structure, i.e. morphology, of the carrier advantageous, i.e. similar to the product desired. This can be arrived at by two different procedures, which can, of course, also be combined: chemically, i.e. by treating the carrier with a certain chemical or certain chemicals, or physically, i.e. by grinding the carrier in a ball mill or in a jet blower mill.

It is also possible to use a procedure in which first an adduct of the carrier, in this case specifically MgCl$_2$, and of the lower alcohol, preferably ethanol, is prepared, and this adduct is smelted, the melt is sprayed by means of gas into a cold solvent or a cold gas, whereupon the adduct crystallizes in a morphologically advantageous form, and this crystalline adduct is used as the catalyst carrier (cf. FI-862459).

The titanium compound used in the preparation of the procatalyst composition of the method according to the invention is preferably an organic or inorganic titanium compound which is at an oxidation degree of 3 or 4. When necessary, even other transition-metal compounds, such as compounds of vanadium, zirconium, chromium, molybdenum, or tungsten, can be mixed with the titanium compound. The titanium compound is usually a halide or oxyhalide, an organic metal halide, or a purely organometallic compound in which only organic ligands are linked to the transition metal. Halides of titanium, specifically TiCl$_4$, are especially preferred.

The alkoxy group of the phthalic acid ester used has at minimum 10 carbon atoms. Thus the ester used may be, for example, diisodecyl phthalate (DIDP), the alkoxy group of which has 10 carbon atoms, and ditridecyl phthalate (DTDP), the alkoxy group of which has 13 carbon atoms. It is also advantageous if the phthalic acid ester serves as a so-called electron donor of the catalyst composition, the purpose being to improve the activity and/or stereospecificity of the polymer obtained. The molar ratio of the phthalic acid ester to the magnesium hydrogenide in the synthesis is preferably in the order of approx. 0.2.

The transesterification can be carried out, for example, by selecting a phthalic acid ester—lower alcohol pair which spontaneously, or with the help of a catalyst which does not damage the procatalyst composition, becomes transesterified in normal catalyst preparation conditions. However, it is often necessary to use an elevated temperature to achieve the transesterification. In such a case it is advantageous to carry out the transesterification at a temperature which is within the range 110°–150° C., and preferably within the range 130°–140° C.

Since the boiling point of liquid TiCl$_4$ at normal pressure is approximately 136° C., the treatment with it, i.e. the so-called titanation, can normally be carried out only at a temperature lower than this. Since usually the titanation medium used is a hydrocarbon solvent, e.g. heptane, hexane or pentane, having a considerably lower boiling point, the titanation temperature is in practice below 100° C., at which temperature transesterification does not occur. Thus, in order to achieve transesterification, it is preferable to use higher boiling solvents, and, for example, nonane (b.p. 151° C.) and decane (b.p. 174° C.) are recommended. In this case it is possible to come closer to the boiling point of TiCl$_4$, and even exceed it as a titanation temperature, whereby a simultaneous transesterification reaction is made possible.

According to one embodiment, the transesterification is carried out by treating an adduct of magnesium dichloride and a lower alcohol, MgCl$_2$*nR$_1$OH, where n is 1–6, with a titanium compound, for example by carrying out titanation with TiCl$_4$, whereupon evidently the following reaction occurs:

$$MgI_2*nR_1OH+nTiCl_4=MgCl_2*nTiCl_3OR_1+nHCl \qquad (1)$$

When the donor, i.e. phthalic acid ester, is added to this titanated carrier, an adduct made up of all the components is probably produced:

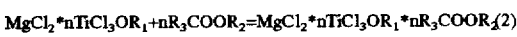
$$MgCl_2*nTiCl_3OR_1+nR_3COOR_2=MgCl_2*nTiCl_3OR_1*nR_3COOR_2 \qquad (2)$$

Since this adduct can be transesterified at a temperature above 110° C., and advantageously above approx. 130° C., the ester groups R$_1$ and R$_2$ change places:

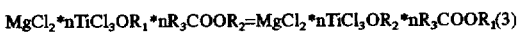
$$MgCl_2*nTiCl_3OR_1*nR_3COOR_2=MgCl_2*nTiCl_3OR_2*nR_3COOR_1 \qquad (3)$$

When the residual material of the catalyst is removed by extraction, an adduct of the carrier and the ester donor is obtained, in which the alcohol-originating group in the ester has changed:

$$MgCl_2*nTiCl_3OR_2*nR_3COOR_1=MgCl_2*nR_3COOR_1+nTiCl_3OR_2 \qquad (4)$$

If a sufficient amount of titanium is left on the carrier, it will serve as an active part of the procatalyst. Otherwise, a new titanation is carried out after the above-mentioned treatment, in order to ensure a sufficiently high titanium content, and thereby sufficiently high activity. The titanium separation of Formula (4) mainly concerns the inactive part of the titanium.

The present invention thus provides a procatalyst composition intended for the polymerization of olefins, the titanium and donor concentrations in the composition being low with respect to the activity of the catalyst. According to one embodiment, the procatalyst composition contains at maximum 2.0 % by weight Ti. Its molar ratio donor/Mg is preferably within the range 0.03–0.06 and/or its donor concentration is within the range 4–6% by weight. According to one embodiment of the invention the alkoxy group of the phthalic acid ester has at minimum 10 carbon atoms, and the activity of the procatalyst composition is at minimum approximately 850 kg PP/g Ti when triethyl aluminum is used as the catalyst and cyclohexylmethyldimethoxy silane is used as the external donor.

The procatalyst composition according to the invention, intended for olefin polymerization, is preferably prepared a) by causing an adduct of $MgCl_2$ and a lower alcohol to react with $TiCl_4$, b) by causing the product of step a) to react with a phthalic acid ester the alkoxy group of which has at minimum 10 carbon atoms, in conditions in which transesterification occurs between the phthalic acid ester and the lower alcohol, c) by washing the product, d) by causing optionally the final product of step c) to react with a titanium product.

In the polymerization method according to the invention, the polymerization is carried out preferably in the presence of an organometallic cocatalyst, such as trialkyl aluminum (e.g. triethyl aluminum), and an external donor, preferably of the type of cyclohexylmethyldimethoxy silane. The polymer formed contains, i.a., some titanium and donor and resembles morphologically the catalyst composition used. Propylene is a preferred olefin monomer.

According to one preferred embodiment of the invention, the phthalic acid ester used is di-isodecyl phthalate in order to obtain a polyolefin having a large proportion of pores 10–100 µm in diameter. According to another preferred embodiment, the phthalic acid ester used is ditridecyl phthalate in order to obtain a polyolefin having a large proportion of pores 1–10 µm in diameter.

The median diameter of pores in a polyolefin according to the invention is preferably at minimum 15 µm, most preferably at minimum 25 µm. The pore volume is preferably at minimum 0.30 ml/g and preferably at minimum 0.20 ml/g.

Below an example case of an olefin polymerization method is presented wherein propylene is polymerized using a catalyst composition in which the catalyst used is a jet-crystallized $MgCl_2 \times 3$ EtOH adduct, which is subsequently titanated with $TiCl_4$ in a hydrocarbon solvent in the presence of di-alkyl phthalates of different lengths. Propylene was polymerized in a hydrocarbon solvent by using the procatalyst composition thus obtained and a trialkylaluminum cocatalyst (triethylaluminum TEA) and an external donor (cyclohexylmethyldimethoxy silane CMMS). If a sufficiently high titanation temperature is used, transesterification will occur between the ethoxy groups originating in the carrier adduct and the long alkyl groups of the donor, and the donor compound will be diethyl phthalate (DEP). The following examples are intended only to illustrate the invention.

EXAMPLES

Donors studied 5 donors were studied in the trial series. They are all presented in Table 1. The donors studied were propylhexyl phthalate (PrHP), dioctyl phthalate (DOP), di-isodecyl phthalate (DIDP), and ditridecyl phthalate (DTDP). Di-isobutyl phthalate (DIBP) was also included in the trial series.

TABLE 1

| | Internal donors studied | | | |
|---|---|---|---|---|
| Experiment | Length of alkyl group | Donor | Molar mass g/mol | Density g/ml |
| 1 | 4 | DIBP | 278 | 1.00 |
| 2 | 6 | PrHP | 292 | 0.95 |
| 3 | 8 | DOP | 390 | 0.96 |
| 4 | 10 | DIDP | 446 | 0.96 |
| 5 | 13 | DTDP | 530 | 0.91 |

Catalyst synthesis 0.1 mole of $MgCl_2 \times 3$ EtOH was suspended in inert conditions in 250 ml of decane in a reactor. The solution was cooled to −15° C., and 300 ml of cold $TiCl_4$ was added. The mixture was then heated under control to +20° C. At this temperature, 0.02 mole of an internal donor was added. The molar ratio of the donor to $MgCl_2$ was 0.2 in all the catalyst syntheses. When all the synthesis reagents were present, the temperature was raised to 135° C. Both the first titanation and the second titanation were carried out at this temperature. The catalyst synthesis was terminated by subjecting the reaction mixture to a wash.

To determine the particle size of the catalyst formed, the particle size distribution of the product was measured, and, microscope pictures were taken of each sample. In addition, the chemical composition of the catalyst was measured by analyzing their Ti, Mg and donor concentrations. X-ray diffraction spectra were also taken in order to examine the changes occurring in the crystal structure.

Trial polymerization

A trial polymerization in the following polymerization conditions was performed on all the catalysts. The reaction vessel used was a two-liter bench reactor. 20–30 mg of procatalyst was used in the trial polymerization. This amount was mixed with 620 µl of triethyl aluminum and 200 µl of a 25-% solution of CMMS in 30 ml of heptane. The polymerizations were carried out at +70° C. and at a propylene monomer pressure of 10 bar. The partial pressure of hydrogen during the polymerization was 0.2 bar. The polymerization lasted for 3 hours. At the beginning of each experiment, prepolymerization occurred during the 10 minutes during which the temperature and pressure rose to the desired polymerization conditions. The activity was measured on the basis of the polymerization yield. The soluble portion of polymer was measured by evaporating the measured proportion out from the polymerization solution. By using these standard polymerization conditions, a polymer material having a MFR ( . . . ) of approx. 8 was prepared.

Characterization of the polymerization batches

The bulk densities and particle size distributions (PSD) of all the polymerization runs were measured. isotacticity was measured by heptane elution, and the isotactic index was determined from the results obtained from the evaporation residue measurements. The melt index was measured at 230° C. by using a 2.16 kg weight. For purposes of further documentation and comparison, microscope pictures were taken of all the polymer batches. Differential scanning calorimeter curves (DSC curves) were taken in order to characterize the melt behavior of the material. The specific surface area and pore volume distribution were measured by using Hg porosimeter equipment.

RESULTS

Table 2 shows the symbols of all the catalysts and the corresponding polymers.

TABLE 2

Symbols of the catalysts used in the study and the polymers

| Length of alkyl group | Catalyst symbol | Polymer symbol |
|---|---|---|
| 4 | C-C-4 | 1 PP-C-4 |
| 6 | C-C-6 | 2 PP-C-6 |
| 8 | C-C-8 | 3 PP-C-8 |
| 10 | C-C-10 | 4 PP-C-10 |
| 13 | C-C-13 | 5 PP-C-13 |

Titanium concentration in the catalyst

Figure 1:
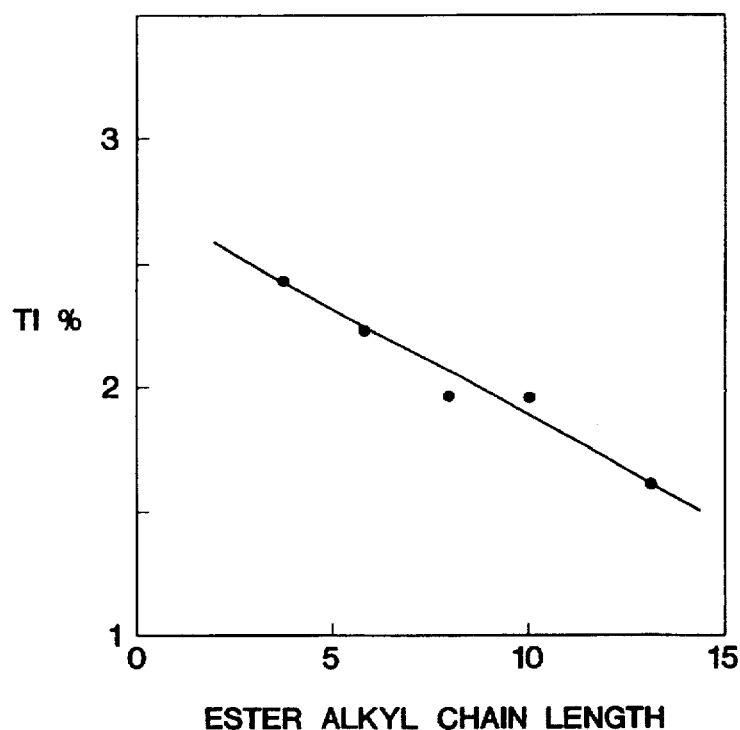
FIG. 1 is a graph showing the Ti concentration in the catalysts as a function of the alkyl group chain length in the donor.

Table 3 shows the magnesium and titanium concentrations in the catalysts. The titanium concentration is also depicted in FIG. 1. The results showed that, while the Mg concentrations remained substantially unchanged, a systematic drop in the Ti-concentration was observable in the catalyst series. The longer the alkyl chain in the alkoxy group of the donor, the lower the Ti concentration in the final procatalyst. The Ti concentration in the last catalyst of the series was 1.6% by weight. This is a value 60% greater than the value of 4% which was achieved in a standard synthesis and as much 30% lower than the titanium concentration found in commercial high-yield catalysts. These results showed that the combination of transesterification and the effectiveness of the $TiCl_3 \times OEt$ wash works better when higher phthalic acid esters are used.

TABLE 3

Mg and Ti concentrations in the catalysts

| Length of alkyl chain | Mg (%) | Ti (%) |
|---|---|---|
| 4 | 18.1 | 2.4 |
| 6 | 20.8 | 2.2 |
| 8 | 22.0 | 1.9 |
| 10 | 20.0 | 1.9 |
| 13 | 17.3 | 1.6 |

Catalyst yield from catalyst synthesis

Figure 2:
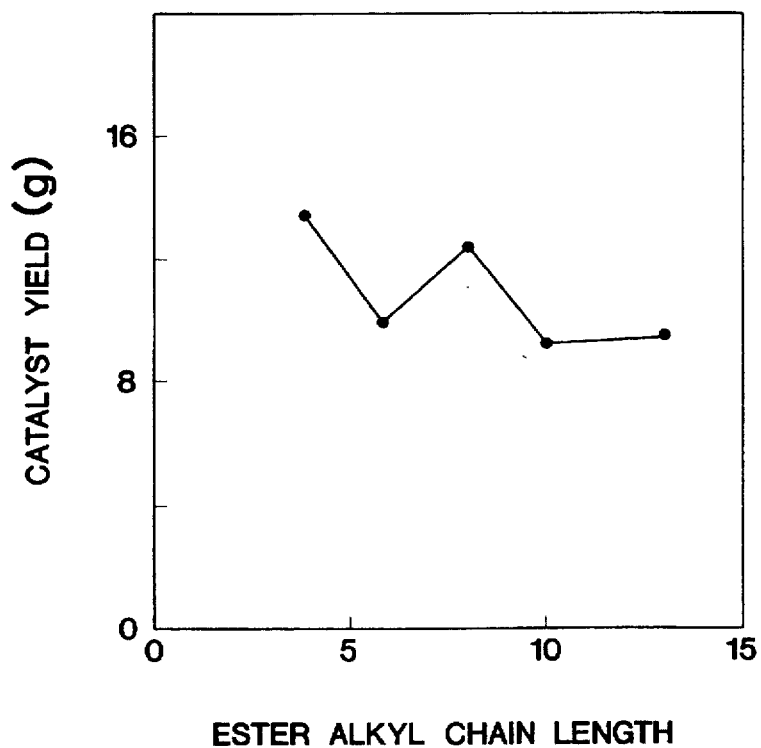
FIG. 2 is a graph showing the total catalyst yield of the catalyst synthesis as a function of the alkyl group chain length in the donor.

Table 4 shows the respective catalyst yield from each catalyst synthesis, and the results are shown graphically in FIG. 2. The same trend is observable as in the first measurements, namely, when the length of the phthalate alkyl chain increases and the titanium concentration decreases, the yield of catalyst also decreases. The yield decrease is very small, only approx. 25%, and is explainable by the decrease of the concentration of $TiCl_4$ in the catalyst and by the weight decrease which occurs when an electron donor having a high molar mass is replaced by an electron donor having a lower molar mass. The decrease in the catalyst yield is also explainable by the decrease in the total donor concentration.

TABLE 4

Catalyst yield from the catalyst synthesis

| Length of alkyl group | Yield (g) |
|---|---|
| 4 | 13.3 |
| 6 | 10.0 |
| 8 | 12.4 |
| 10 | 9.1 |
| 13 | 9.2 |

Donor concentration in the catalysts

Figure 3:
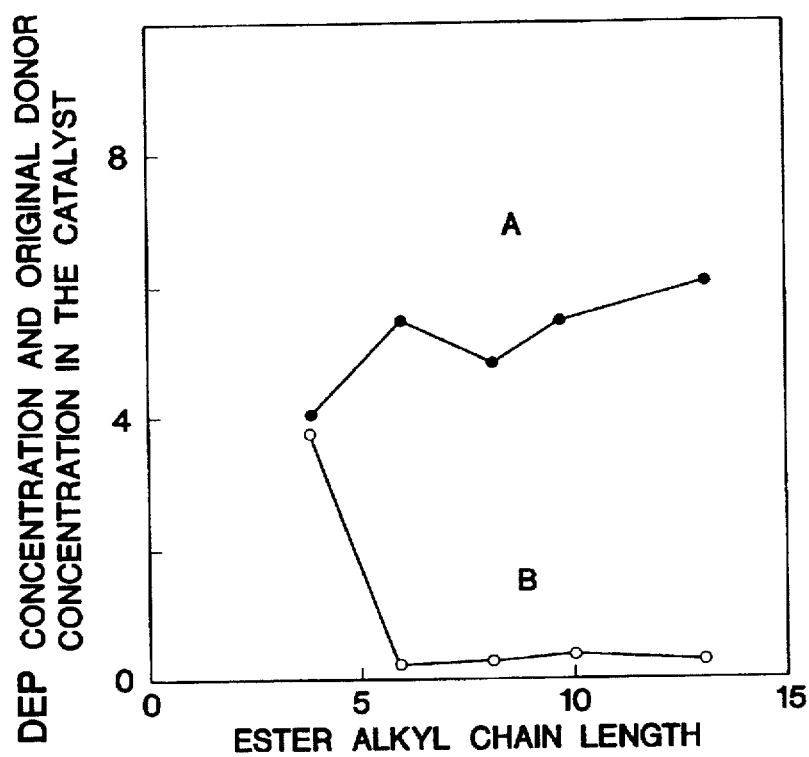
FIG. 3 is a graph showing the concentrations, produced in the catalyst synthesis, of the transesterified donor DEP (A) and the original donors (B)

The donor concentrations in the catalysts were measured liquid chromatometrically by the HPLC method. The results are listed in Table 5, and they are shown graphically in FIG. 3. A small fraction of mixed esters and a small fraction of phthalic acid anhydride were observed in all the catalysts. As can be seen in FIG. 3, the transesterification was not complete for the first catalyst of the trial series. The transesterification degree of DIBP was only 70%. This means that DIBP is not completely transesterified at a temperature of 135° C. In all the other syntheses the transesterification was complete. Only traces of the original ester were found in their products. The amount of transesterified diethyl phthalate DEP found in the catalysts was approximately constant, and close to 5%. This corresponds to a D/Mg ratio of 0.03–0.04 (D=donor), which is an even lower value than that attained when DIBP was transesterified at 143° C.

These results show that transesterification improves when longer alkyl chains are used in the phthalic acid esters. It is also evident that a low molar ratio of electron donor to $MgCl_2$ is achieved.

TABLE 5

Donor composition of catalysts. PA = acid anhydride and IE = mixed esters produced during transesterification

| Length of alkyl group | Original (%) | DEP (%) | PA (%) | IE (%) |
|---|---|---|---|---|
| 4 | 3.6 | 4.0 | 1.3 | 1.0 |
| 6 | 0.2 | 5.3 | 0.3 | 0.9 |
| 8 | 0.3 | 4.8 | 0.7 | 0.4 |
| 10 | 0.4 | 5.3 | 1.1 | 0.5 |
| 13 | 0.2 | 5.9 | 0.7 | 0.4 |

Particle size distributions (PSD) of the catalysts

Figure 4:
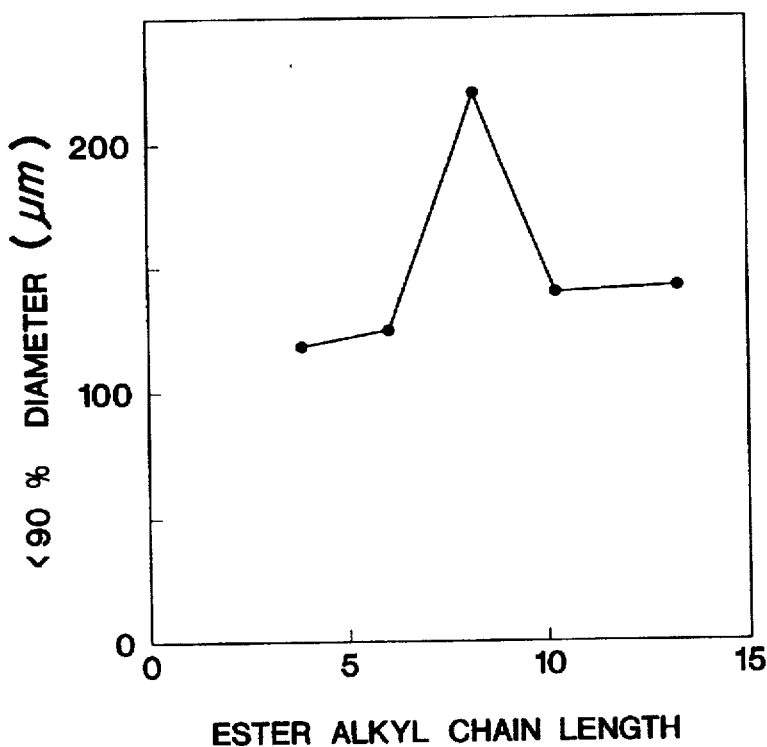
FIG. 4 is a graph showing the diameter of the large particle fraction (<90%) as a function of the alkyl group chain length in the donor.
Figure 5:
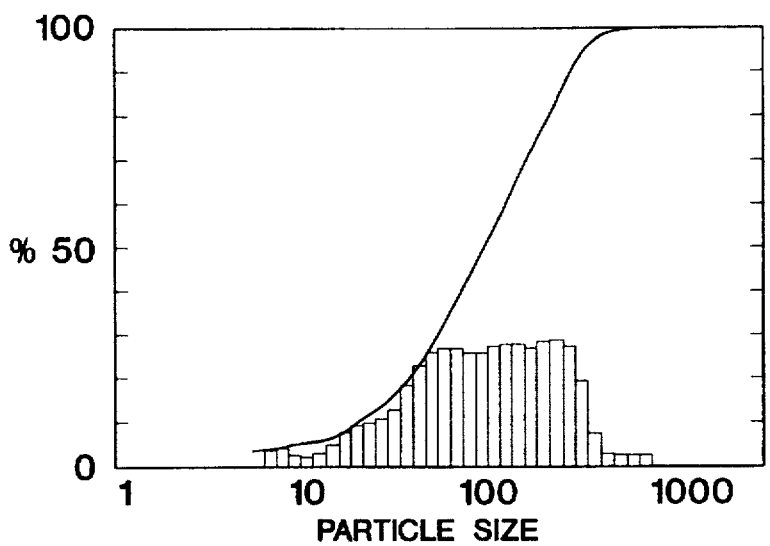
FIG. 5 is a graph showing the catalyst particle size distribution when octyl phthalate (C=8) was used as an internal donor.
Figure 6:
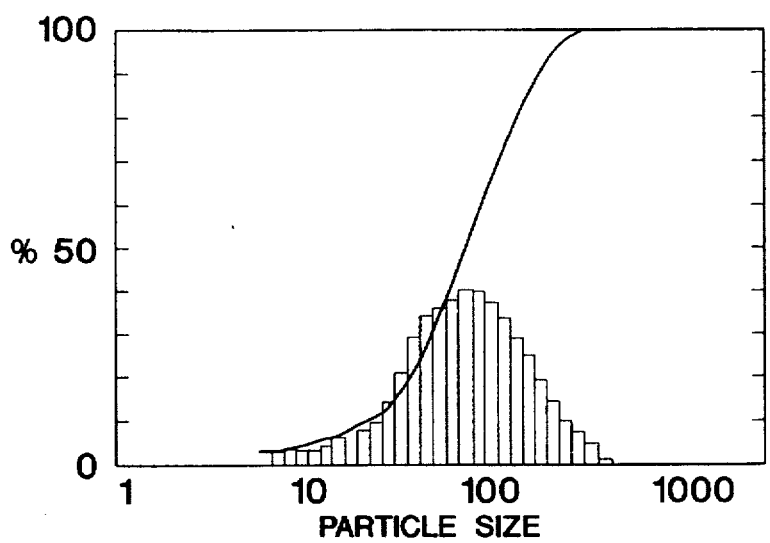
FIG. 6 is a graph showing the catalyst particle size distribution when decyl phthalate (C=10) was used as an internal donor.
Figure 7:
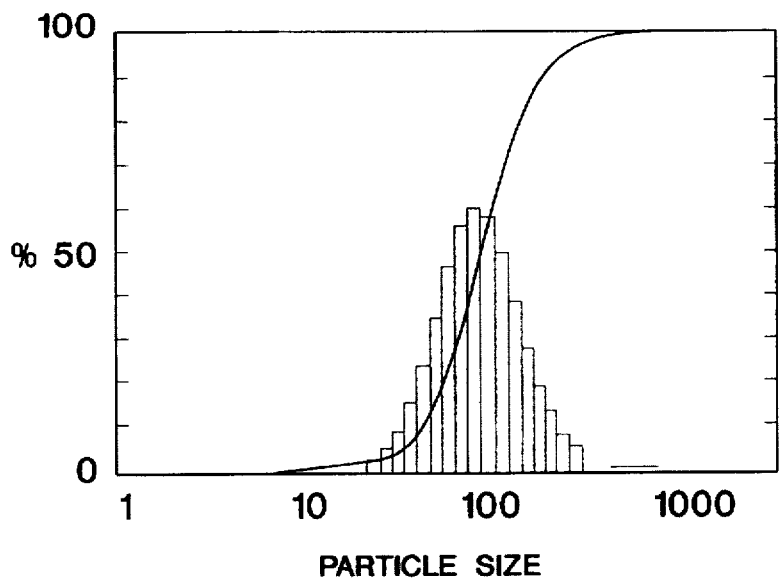
FIG. 7 is a graph showing the catalyst particle size distribution when tridecyl phthalate (C=13) was used as an internal donor.
Figure 8:
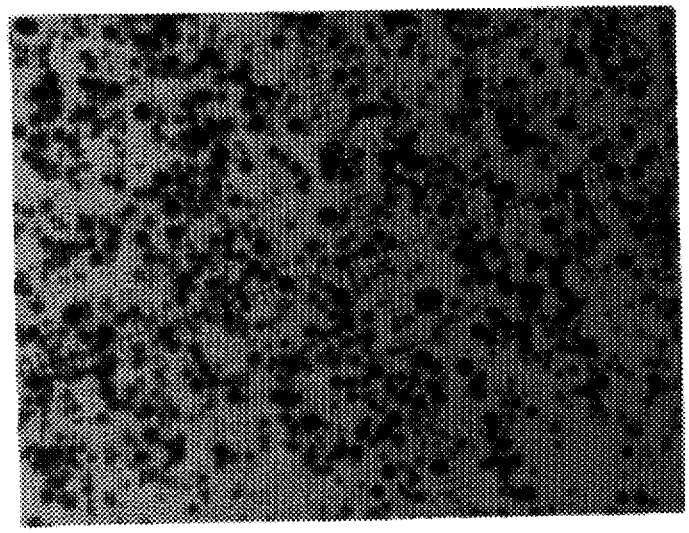
FIG. 8 is a microscope picture of the catalyst C-C-4, C=4, unit=25 µm.
Figure 9:
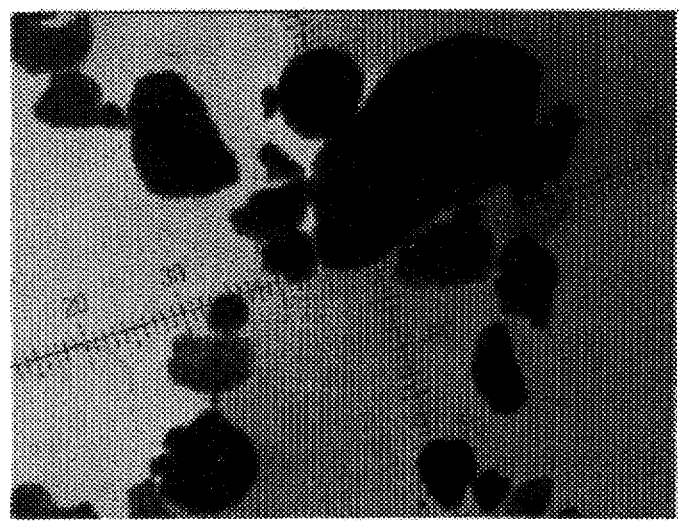
FIG. 9 is a microscope picture of the catalyst C-C-8, C=8, unit=50 µm.
Figure 10:
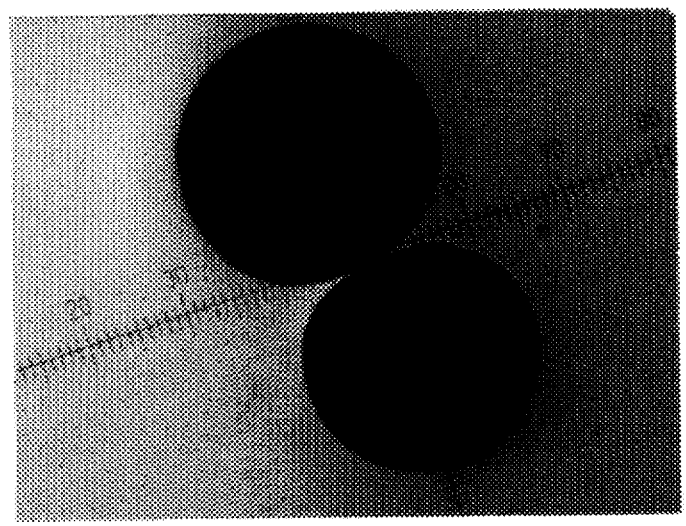
FIG. 10 is a microscope picture of the catalyst C-C-10, C=8, unit=50 µm.

The PSDs of the catalysts were also measured, and the results are shown in Table 6. FIG. 4 shows the mean particle diameter of a fraction containing more than 90% of the particles, as a function of the length of the alkyl chain of the donor. The results show that, as the donor composition changed, the PSD also changed greatly. It was observable at the same time that the catalyst particles agglomerated when higher phthalic acid esters were used. This agglomeration can be seen in the PSD curves of FIGS. 5, 6 and 7 and in the microscope pictures of FIGS. 8, 9 and 10. The results also showed that the agglomeration decreased somewhat when the highest phthalic acid esters were used. By the use of DIDP (C=10), very beautifully formed catalyst particles having a diameter of approx. 140 μm were obtained. This is evident from FIG. 10.

TABLE 6

Particle distributions of the catalysts

| Length of alkyl group | D (0.9) μm | D (0.5) μm | D (0.1) μm |
|---|---|---|---|
| 4 | 117 | 62 | 34 |
| 6 | 127 | 68 | 36 |
| 8 | 218 | 76 | 17 |
| 10 | 138 | 56 | 18 |
| 13 | 140 | 69 | 36 |

X-ray diffraction spectra of the catalysts

Figure 11:
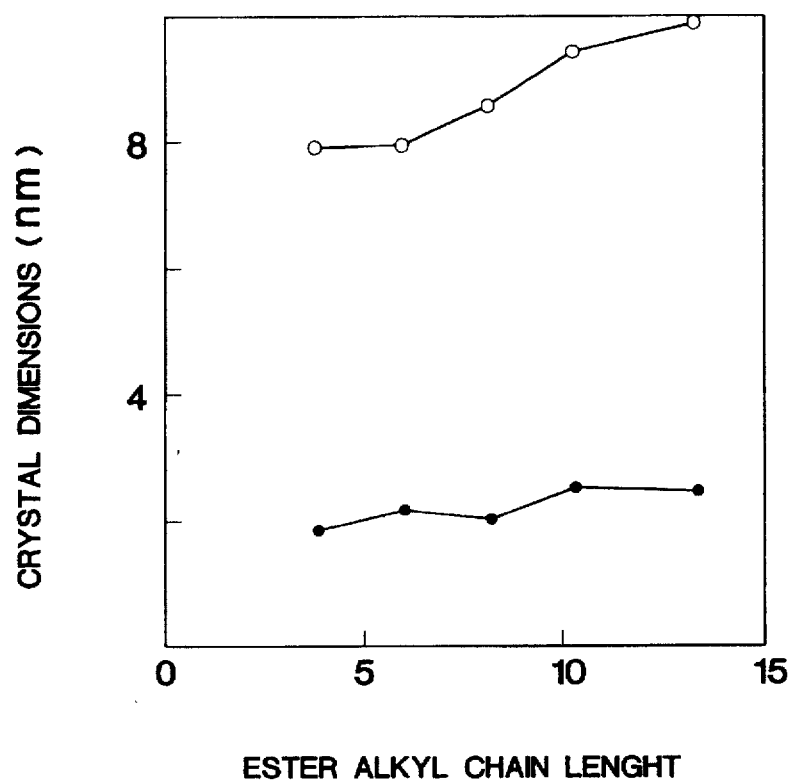
FIG. 11 is a graph showing the width (A) and height (B) of the $MgCl_2$ crystal as a function of the alkyl group chain length in the donor.

As a result of the transesterification, a new procatalyst structure was produced, which is evident from the double peak at 13°–15°. To follow up the effect of higher phthalate esters, X-ray patterns were taken of all the catalysts of the trial series. Table 7 lists the crystal dimensions deduced from the patterns, and the results are also shown in FIG. 11. According to the results, a crystal widened systematically as the alkyl chain of the ester lengthened. Crystals 25% wider were obtained with DTDP than with DIBP.

Figure 12:
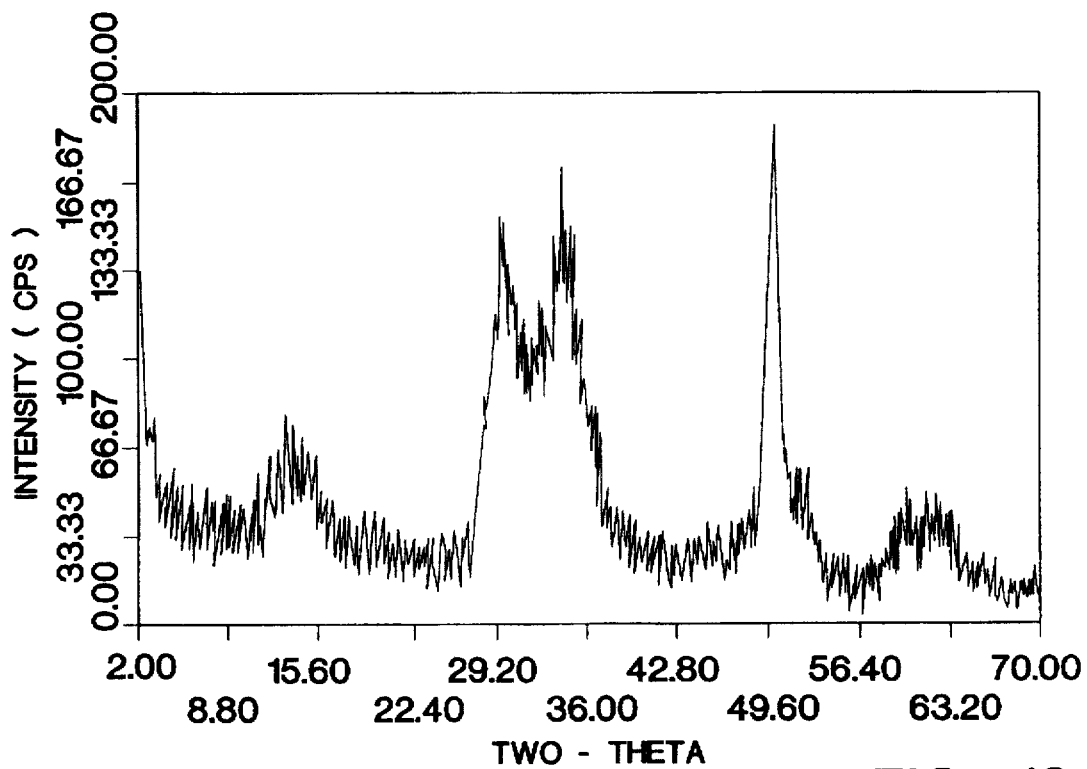
FIG. 12 is a X-ray pattern of the catalyst C-C-6, in which internal donor PrHP has been transesterified to DEP, a double peak is observable at 13°–15°.

FIG. 12 shows the X-ray diffraction spectrum of the catalyst C-C-6. According to the pattern, recrystallization occurs in the $MgCl_2$ crystal lattice, which is evident as a sharpening of the crystal peak at 30° and 35°. The formation of a double peak at 13°–15° is also visible.

TABLE 7

Crystal dimensions of the $MgCl_2$ material in the catalysts

| Length of alkyl group | Height (nm) | Cutting planes Width (nm) | Growth (%) |
|---|---|---|---|
| 4 | 1.8 | 7.9 | 0 |
| 6 | 2.1 | 7.9 | 0 |
| 8 | 1.9 | 8.4 | 6 |
| 10 | 2.3 | 9.3 | 18 |
| 13 | 2.2 | 9.8 | 24 |

Surface areas and pore volumes of the catalysts

Both the surface areas and the pore volumes of the catalysts were measured. The results are listed in Table 8. According to the results, the surface area of a catalyst remained almost unchanged regardless of the donor used in the synthesis. The specific surface area attained was in the order of approx. 300 $m^2/g$. On the other hand, the pore volume increased when a shift was made to longer-chain donors. In the last catalyst of the series, an increase as high as 60% was observed. The increase in the pore volume is partly explainable by the agglomeration of catalyst particles.

TABLE 8

Specific surface areas and pore volumes of the catalysts

| Length of alkyl group | Surface area ($m^2/g$) | Pore volume (ml/g) |
|---|---|---|
| 4 | 348 | 0.524 |
| 6 | 316 | 0.738 |
| 8 | 311 | 0.581 |
| 10 | 339 | 0.776 |
| 13 | 292 | 0.814 |

Activities of the catalysts

Figure 13:
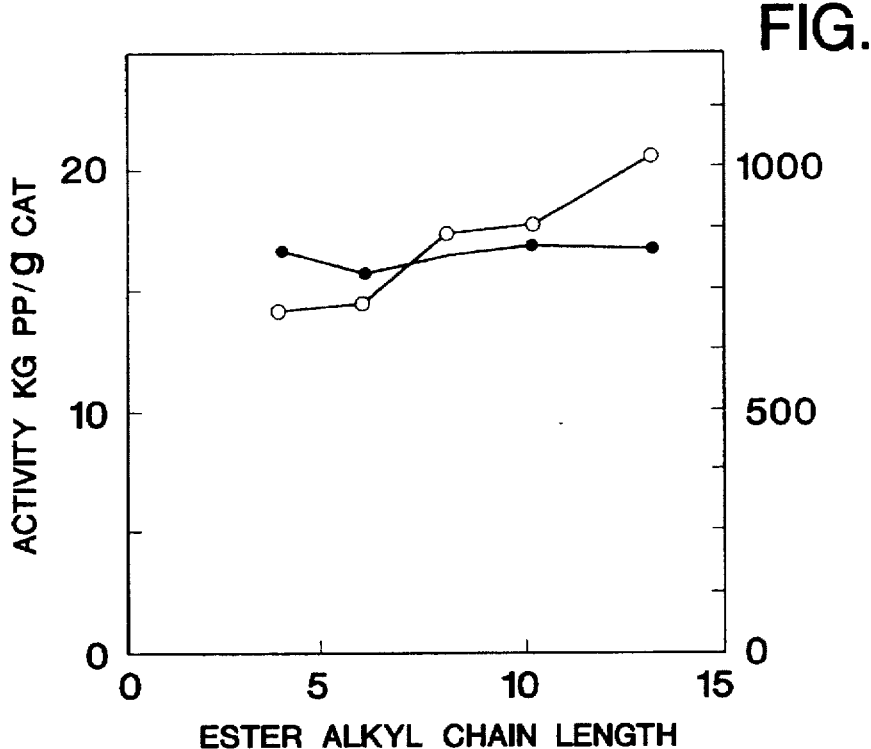
FIG. 13 is a graph showing the catalyst activity as a function of the alkyl group chain length in the donor, curve (A) refers to the unit kg PP/g cat. and curve (B) to the unit kg PP/g Ti.

All of the catalysts were trial polymerized in the conditions referred to above. The results are shown in Table 9 and in FIG. 13. The activity based on the weight of the catalyst and the polymer remained constant for the whole catalyst series, and was approx. 16 kg/g cat. Expressed using the unit kg PP/g Ti, the activity increased systematically. This was due to the fact that the Ti concentration decreased respectively when a shift was made to higher phthalic acid esters. Thus an activity value of 1019 kg PP/g Ti was obtained for the last catalyst. When decane was used as the activation medium, the catalyst activity was somewhat lower.

TABLE 9

Catalyst activity

| Length of alkyl group | Activity (kg PP/g cat.) | Activity (kg PP/g Ti) |
|---|---|---|
| 4 | 16.6 | 692 |
| 6 | 15.6 | 709 |
| 8 | 16.2 | 853 |
| 10 | 16.6 | 874 |
| 13 | 16.3 | 1019 |

Particle size distributions (PSD) of the polymers

Figure 17:
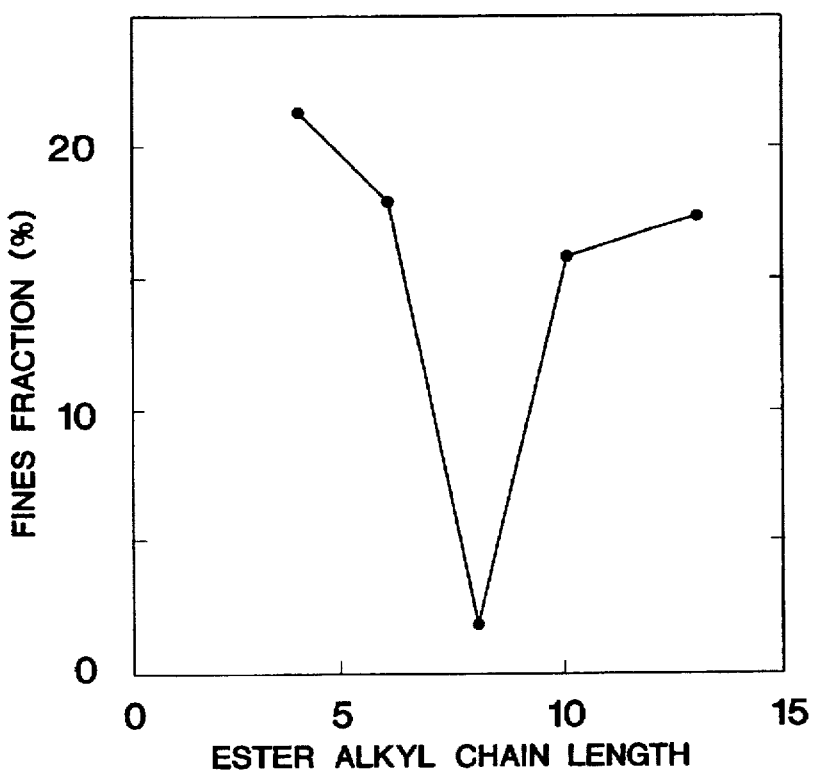
FIG. 17 is a graph showing the total amount of fines fraction (d<1 mm) as a function of the alkyl group chain length in the donor.
Figure 14:
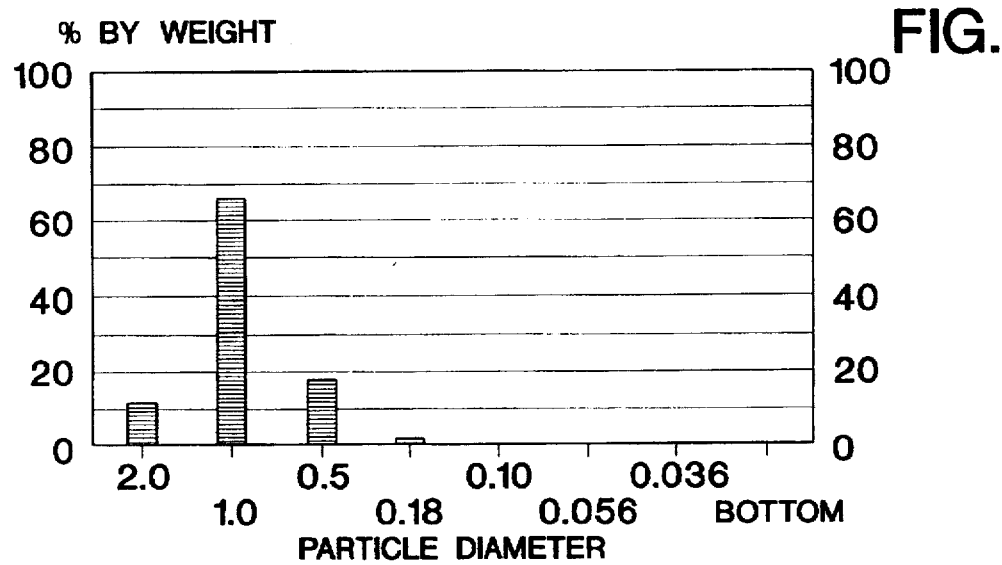
FIG. 14 is a graph showing the particle size distribution of the polymer PP-C-4 (C=4)
Figure 15:
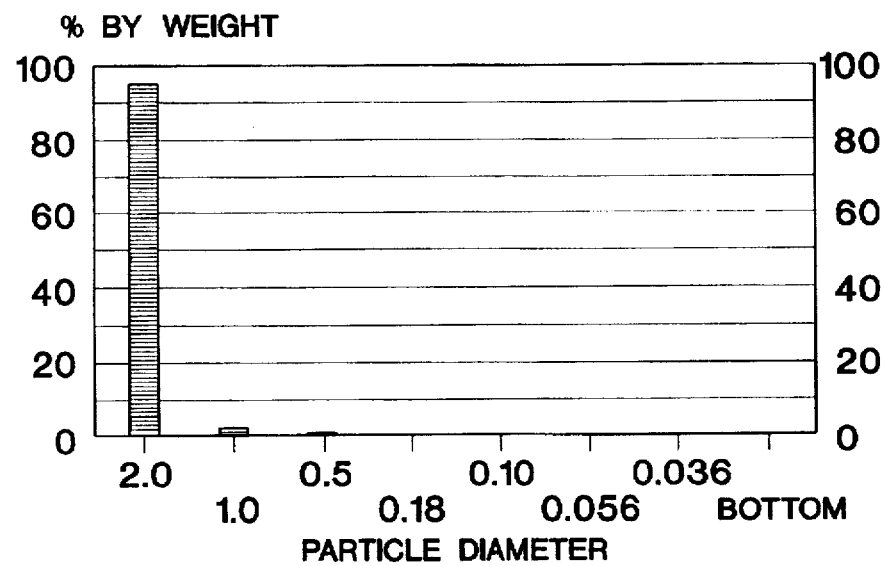
FIG. 15 is a graph showing the particle size distribution of the polymer PP-C-8 (C=8)
Figure 16:
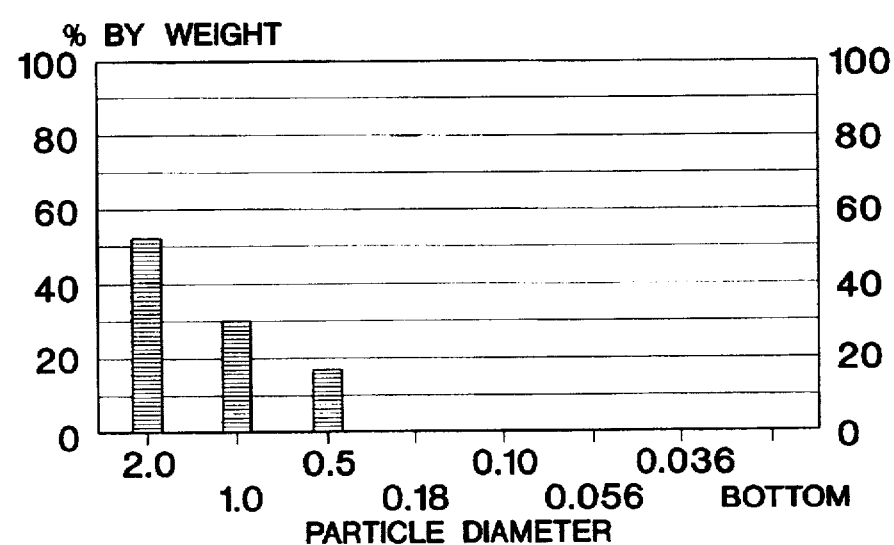
FIG. 16 is a graph showing the particle size distribution of the polymer PP-C-13 (C=13)

Table 10 shows the PSD of the polymers together with the total amount of fines, i.e. particles of less than 1 mm. The amount of the fines fraction is also shown graphically in FIG. 17. The polymer PSD results follow the same formula as the catalyst PSD results. This can be seen in the PSD diagrams in FIGS. 14, 15 and 16.

TABLE 10

Particle size distributions of the polymers

| Alkyl length | % <2.0 mm | % <1.0 mm | % <0.5 mm | % <0.18 mm | % <0.10 mm | % <0.056 mm | Remainder (%) |
|---|---|---|---|---|---|---|---|
| 4 | 12.0 | 67.4 | 18.5 | 1.8 | 0.2 | 0.1 | 20.6 |
| 6 | 10.7 | 71.3 | 17.7 | 0.2 | 0.1 | 0.0 | 18.0 |
| 8 | 95.0 | 3.1 | 1.1 | 0.5 | 0.2 | 0.1 | 1.9 |
| 10 | 14.6 | 69.4 | 15.5 | 0.5 | 0.2 | 0.0 | 16.0 |
| 13 | 52.1 | 30.4 | 17.1 | 0.2 | 0.1 | 0.1 | 17.5 |

Bulk densities of the polymers

Figure 18:
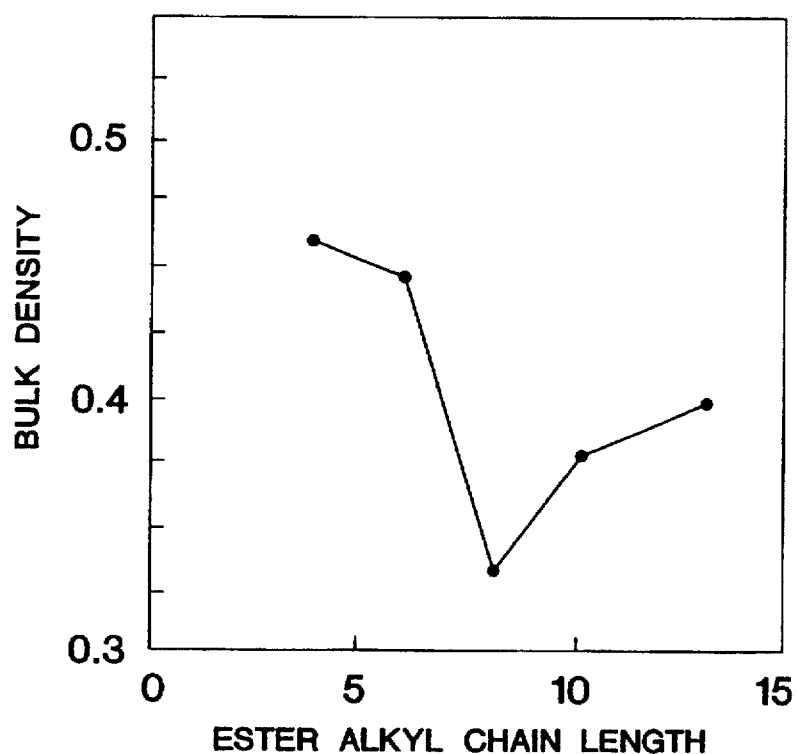
FIG. 18 is a graph showing the bulk density of the polymers as a function of the alkyl group chain length in the donor.

The bulk density decreased when higher phthalic acid esters were used in the transesterification syntheses. The results are listed in Table 11 and depicted in FIG. 18.

TABLE 11

Bulk densities of the polymers

| Length of alkyl group | Bulk density (g/ml) |
|---|---|
| 4 | 0.46 |
| 6 | 0.44 |
| 8 | 0.33 |
| 10 | 0.37 |
| 13 | 0.39 |

Melt indices of the polymers

The ester chain length did not have great effect on the melt index. The results are shown in Table 12.

TABLE 12

Melt indices of the polymers

| Length of alkyl group | Melt index (2.16 kg) |
|---|---|
| 4 | 10.5 |
| 6 | 9.3 |
| 8 | 10.0 |
| 10 | 7.3 |

Molecular weights of the polymers

No systematic changes in the molecular weight distribution were observable as the esters changed. All the results are listed in Table 13. The results correspond to results normally obtained in standard polymerization.

TABLE 13

Molecular weight distributions of the polymers

| Length of alkyl group | Mn | Mw | Mv | D |
|---|---|---|---|---|
| 4 | 58 100 | 273 000 | 223 000 | 4.7 |
| 4 | 58 800 | 274 000 | 222 000 | 4.7 |
| 6 | 56 000 | 281 000 | 225 000 | 5.2 |
| 6 | 55 200 | 289 000 | 233 000 | 5.2 |
| 8 | 60 100 | 273 000 | 221 000 | 4.6 |
| 8 | 60 700 | 279 000 | 228 000 | 4.6 |

TABLE 13-continued

Molecular weight distributions of the polymers

| Length of alkyl group | Mn | Mw | Mv | D |
|---|---|---|---|---|
| 10 | 73 800 | 331 000 | 269 000 | 4.5 |
| 10 | 74 600 | 334 000 | 270 000 | 4.5 |

Results of polymer DSC measurements

Figure 19:
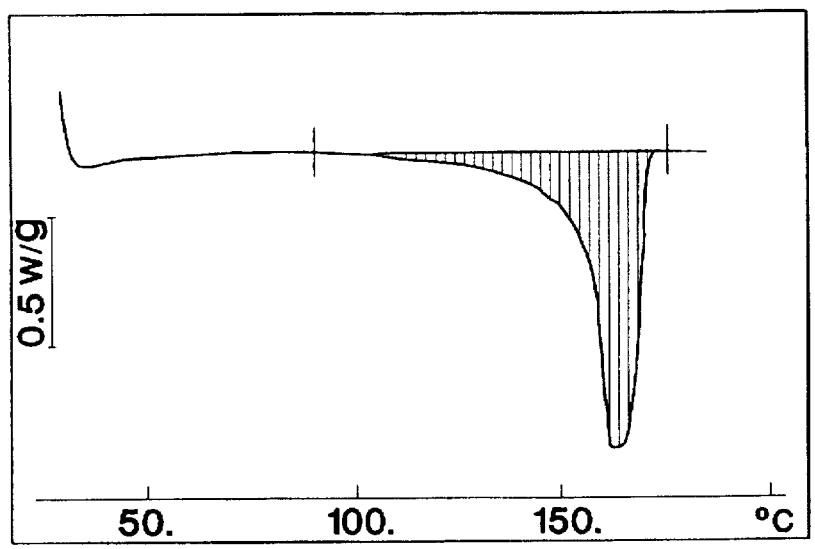
FIG. 19 is a DSC (differential scanning calorimeter) curve of the polymer PP-C-4.

Table 14 lists the melting points, crystallization points and crystallinity percentages of the polymers. In this, also, no systematic dependence on the esters used was observable. The melting point is approx. 161° C. and the crystallization temperature is approx. 114° C. Crystallinity is approx. 51–52%. FIGS. 19, 20 and 21 show a number of melting curves.

It can be stated in general that there prevails a correlation between the catalyst titanation temperature and the crystallization temperature. A higher titanation temperature yields a purer catalyst and a more homogeneous polypropylene. This, for its part, increases the crystallinity of the polymer and lowers its crystallization temperature. FIG. 22 shows diagrammatically the correlation between the catalyst titanation temperature and the polymer crystallization temperature.

TABLE 14

Melting points, crystallization temperatures and crystallinity percentages of the polymers

| Length of alkyl group | Melting point (°C.) | Crystallization point (°C.) | Crystallinity (%) |
|---|---|---|---|
| 4 | 161.6 | 114.1 | 51.4 |
| 6 | 161.0 | 113.5 | 50.7 |
| 8 | 161.6 | 113.4 | 51.8 |
| 10 | 161.6 | 114.7 | 52.7 |
| 13 | 158.3, 164.3 | 114.8 | 51.9 |

Specific surface area and pore volume distributions of the polymers

Table 15 shows the results of the surface area and pore volume measurements. The measurements were carried out using Hg-porosimeter equipment. The results corresponded to the results obtained with the corresponding catalysts. As is evident from FIG. 23, the specific surface area of the pores decreases only slightly when higher phthalic acid esters are used in the transesterification synthesis. The pore volume, for its part, increased linearly according to the length of the alkyl chain in the phthalic acid ester, as shown in FIG. 24. The increase was approx. 100% for the last polymer of the series, as compared with the first polymer of the series. When the results were examined in greater detail, it was found that the pore volume increase was manifested as an increase in the number of pores of a certain size, depending on the phthalic acid ester used. According to FIG. 25, DIDP greatly increased the proportion of the large-pore fraction (10–100 μm), whereas DTDP increased the proportion of small pores (1–10 μm). This last result is not explainable by agglomeration, since agglomeration was not considerable in these last experiments. As a consequence of the pore volume increase, the median diameter in the pore size distribution increases up to decyl ester, whereafter there is a slight drop; see FIG. 26. FIG. 27 shows a comparison of the pore volumes of the catalysts and the polymers. According to the figure, the pore volume of the polymers increases drastically when the pore volume of the catalysts exceeds 0.7 ml/g.

Until that the polymer pore volume is stable within the range 0.22–0.25 ml/g, but thereafter the polymer pore volume increases rapidly beyond 0.4 ml/g.

TABLE 15

Specific surface areas, pore volumes, and median diameters of pores of the polymers

| Length of alkyl group | Surface area (m²/g) | Pore volume (ml/g) | Pore diameter (μm) |
|---|---|---|---|
| 4 | 53.5 | 0.22 | 1.2 |
| 6 | 52.4 | 0.25 | 4.9 |
| 8 | 58.5 | 0.24 | 1.5 |
| 10 | 46.0 | 0.35 | 26.3 |
| 13 | 41.2 | 0.41 | 18.8 |

We claim:

1. A process for making a procatalyst composition suitable for preparing polyolefins having a median pore diameter of at least 15 μm, a) contacting and mixing together (i) a solid $MgCl_2$ carrier selected from the group consisting of solid $MgCl_2$ and $MgCl_2$ impregnated on silica, (ii) a lower alcohol $R_1OH$ wherein $R_1$ is a $C_1$–$C_4$-alkyl group, (iii) a titanium compound, and (iv) a first alkyl ester of phthalic acid, wherein the alkyl moiety of said first alkyl ester of phthalic acid has at least 6 carbon atoms, to form a composition comprising a contacting product comprising b) heating said composition comprising said contacting product to a temperature of between 130° C. and 140° C. to transesterify said lower alcohol and said first alkyl ester of phthalic acid into a transesterification product comprising a second alkyl ester of phthalic acid, wherein the alkyl moiety of said second alkyl ester of phthalic acid is said $C_1$–$C_4$-alkyl group, $R_1$; and c) separating and washing said transesterification product; and d) recovering said transesterification product as said procatalyst composition.

2. The process according to claim 1, wherein said washing step c) comprises:

separating and washing said transesterification product; and reacting the washed transesterification product with an additional amount of titanium compound, thereby obtaining a further titanated transesterification product; and wherein said recovering step d) comprises recovering said further titanated transesterification product as said procatalyst composition.

3. A procatalyst composition suitable for preparing polyolefins having a median pore diameter of at least 15 μm, said composition being produced by a process which comprises:

a) contacting and mixing together (i) a solid $MgCl_2$ carrier selected from the group consisting of solid $MgCl_2$ and $MgCl_2$ impregnated on silica, (ii) a lower alcohol $R_1OH$ wherein $R_1$ is a $C_1$–$C_4$-alkyl group, (iii) a titanium compound, and (iv) a first alkyl ester of phthalic acid, wherein the alkyl moiety of said first alkyl ester of phthalic acid has at least 6 carbon atoms, to form a composition comprising a contacting product;

b) heating said composition comprising contacting product to a temperature of between 130° C. and 140° C. to transesterify said lower alcohol and said first alkyl ester of phthalic acid and form a transesterification product comprising a second alkyl ester of phthalic acid, wherein the alkyl moiety of said second alkyl ester of phthalic acid is said $C_1$–$C_4$-alkyl group, $R_1$;

c) separating and washing said transesterification product; and d) recovering said transesterification product as said procatalyst composition.

4. The procatalyst composition according to claim 3, wherein said washing step c) comprises:

separating and washing said transesterification product; and then reacting the washed transesterification product with an additional amount of titanium compound, thereby obtaining a further titanated transesterification product; and wherein said recovering step d) comprises recovering said further titanated transesterification product as said procatalyst composition.

5. The procatalyst composition according to claim 3, wherein said transesterification has been carried out in a solvent having a boiling point which exceeds the transesterification temperature.

6. The procatalyst composition according to claim 5, wherein said solvent is nonane or decane.

7. The procatalyst composition according to claim 3, wherein said lower alcohol $R_1OH$ is ethanol.

8. The procatalyst composition according to claim 3, wherein said titanium compound is $TiCl_4$.

9. The procatalyst composition according to claim 3, wherein said phthalic acid ester is diisohexyl phthalate, diisodecyl phthalate or ditridecyl phthalate.

10. A method for preparing polyolefins having a median pore diameter of at least 15 μm, comprising:

(A) a polymerizing step, comprising contacting olefins with a procatalyst composition, wherein said procatalyst composition has been prepared by a process comprising:

(a) contacting and mixing together (i) a solid $MgCl_2$ carrier selected from the group consisting of solid $MgCl_2$ and $MgCl_2$ impregnated on silica, a (ii) lower alcohol $R_1OH$ wherein $R_1$ is a $C_1$–$C_4$-alkyl group, (iii) and a titanium compound to form a composition comprising a first reaction product, and reacting said composition comprising a first reaction product with a first alkyl ester of phthalic acid, wherein the alkyl moiety of said first alkyl ester of phthalic acid has at least 6 carbon atoms, to form a composition comprising a contacting product;

(b) heating said composition comprising contacting product to a temperature of between 130° C. and 140° C. thereby transesterifying said lower alcohol and said first alkyl ester of phthalic acid into a transesterification product comprising a second alkyl ester of phthalic acid, wherein the alkyl moiety of said second alkyl ester of phthalic acid is said $C_1$–$C_4$-alkyl group, $R_1$;

(c) separating and washing said transesterification product; and (d) recovering the washed transesterification product as said procatalyst composition; and (B) recovering the polyolefin prepared with said procatalyst composition.

11. The method of preparing polyolefins according to claim 10, wherein after recovering the washed transesterification product of step (d), the washed transesterification product is reacted with an additional amount of titanium compound, thereby obtaining a further titanated transesterification product as said procatalyst composition.

12. The method according to claim 10, wherein said phthalic acid ester is diisohexyl phthalate.

13. The method according to claim 10, wherein said olefin is propylene.

14. The method according to claim 10, wherein said lower alcohol $R_1OH$ is ethanol.

15. The method according to claim 10, wherein said titanium compound is $TiCl_4$.

16. The method according to claim 10, wherein said phthalic acid ester is di-isodecyl phthalate or ditridecyl phthalate.

17. The method according to claim 10, wherein said polymerizing step further comprises simultaneously contacting said olefin with an organometallic cocatalyst.

18. The method according to claim 17, wherein said cocatalyst is trialkyl aluminum.

19. The method according to claim 17, wherein said polymerizing step further comprises simultaneously contacting said olefin with an external donor.

20. The method according to claim 19, wherein said external donor is cyclohexylmethyldimethoxy silane.

21. The method according to claim 10, wherein said phthalic acid ester is di-isodecyl phthalate.

22. The method according to claim 21, wherein said polyolefin has a large proportion of pores having a diameter of 10–100 μm.

23. The method according to claim 10, wherein said phthalic acid ester is ditridecyl phthalate.

24. The method according to claim 23, wherein said polyolefin has a large proportion of pores having a diameter of 10–100 μm.

25. A polyolefin having a median pore diameter of at least 15 μm, which has been prepared by the process of claim 10.

26. The polyolefin according to claim 25, wherein said pores have a median diameter of at least 25 μm.

27. The polyolefin according to claim 25, wherein said polyolefin has a pore volume of at minimum 0.30 ml/g.

28. The polyolefin according to claim 27, wherein said pore volume is at least 0.40 ml/g.

* * * * *